US006620976B2

(12) United States Patent
Sakanoue et al.

(10) Patent No.: US 6,620,976 B2
(45) Date of Patent: Sep. 16, 2003

(54) POLYETHYLENE GLYCOL AND PROCESS FOR PRODUCING THE SAME

(75) Inventors: Kenji Sakanoue, Kawasaki (JP); Kouzoh Sanchika, Kawasaki (JP); Tohru Yasukohchi, Yokohama (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 10/106,219

(22) Filed: Mar. 27, 2002

(65) Prior Publication Data

US 2002/0193640 A1 Dec. 19, 2002

(30) Foreign Application Priority Data

Mar. 27, 2001 (JP) .................................. P.2001-089455
Nov. 22, 2001 (JP) .................................. P.2001-357035

(51) Int. Cl.[7] .................. C07C 43/11; C07C 43/18; C07C 43/20
(52) U.S. Cl. ................ 568/623; 568/619; 568/621
(58) Field of Search .................. 568/613, 618, 568/619, 621, 622, 623, 624, 625

(56) References Cited

U.S. PATENT DOCUMENTS 3,371,015 A    2/1968   Sjogren et al.
4,650,909 A    3/1987   Yoakum

FOREIGN PATENT DOCUMENTS

EP    1 097 721 A2    5/1991
GB    1 363 182 A     8/1974

OTHER PUBLICATIONS

Patent Abstracts of Japan (62227153) Oct. 6, 1987.
XP–002202536—Golovushkin et al, " Optimization of Polyethylene Glycol Production" (abstract) (1997).
European Search Report dated Aug. 6, 2002.
JP Forum; *International Harmonization,* vol. 8, No. 4, pp. 291–297 (1999).

*Primary Examiner*—Johann Richter
*Assistant Examiner*—Elvis O. Price
(74) *Attorney, Agent, or Firm*—Sughrue Mion, PLLC

(57) ABSTRACT

Polyethylene glycol for use in fields with application to a living body wherein the sum of the contents of ethylene glycol and diethylene glycol in the polyethylene glycol is less than or equal to that expressed in the following formula [I]:

$$\text{Sum of ethylene glycol and diethylene glycol contents (ppm)} = \frac{150 \times 2900 \times 0.85^{(x-150)/44}}{x} \quad [I]$$

wherein x represents the average molecular weight of the polyethylene glycol, and the polyethylene glycol has an average molecular weight ranging from 190 to 1,050.

2 Claims, No Drawings

POLYETHYLENE GLYCOL AND PROCESS FOR PRODUCING THE SAME

BACKGROUND OF THE INVENTION

1. Field of the Invention

This invention relates to a polyethylene glycol with low ethylene glycol and diethylene glycol contents which is to be used in fields with application to a living body such as the pharmaceutical field and the cosmetic industry, and a process for producing the same.

2. Description of the Related Art

Polyethylene oxide, which is a material generally obtained by polymerizing ethylene oxide, has inherent characteristics of being viscous, causing no irritation, being soluble in water and having lubricating properties. Owing to these characteristics, this compound has been widely used in water base paints, paper coatings, adhesives, printing inks, surfactants and the like.

Among all, polyethylene glycol serves as an important material in producing drugs and cosmetics in the fields with respect to a living body such as the pharmaceutical field and the cosmetic industry, since it has excellent solubility and compatibility. In particular, polyethylene glycol compounds called "Macrogols" having different molecular weights are listed as official drugs in the Pharmacopoeia of Japan and employed as dissolution aids and fillers in various drugs and cosmetic materials.

Polyethylene glycol contains ethylene glycol and diethylene glycol the contents of which are specified to 0.25% (2,500 ppm) or less in the United States Pharmacopoeia etc., with respect to polyethylene glycols having a molecular weight of 1,000 or less for use in fields with application to a living body.

Among all, there has been no polyethylene glycol having an average molecular weight of from 190 to 210 which meets the requirement for ethylene glycol and diethylene glycol content as defined in United States Pharmacopoeia and the Pharmacopoeia of Japan, i.e., 0.25% (2,500 ppm) or less [J P Forum; Vol. 8, No. 4, 291–297 (1999)]. Although some polyethylene glycol products having an average molecular weight of 211 to 420 meet this standard, there is a requirement in fields concerning the living body such as the drug and cosmetic fields to further lessen the ethylene glycol and diethylene glycol contents.

With respect to polyethylene glycol having an average molecular weight of from 421 to 1,050, even commercial products meet the standards of the ethylene glycol and diethylene glycol contents stated in the United States Pharmacopoeia, i.e., 0.25% (2,500 ppm) or less. In fields concerning the living body such as the drug and cosmetic fields, however, there is a requirement to further lessen the ethylene glycol and diethylene glycol contents.

It has been a common practice to produce polyethylene glycol by addition-polymerizing ethylene oxide to ethylene glycol or diethylene glycol in the presence of an alkali catalyst such as sodium hydroxide or potassium hydroxide with heating under elevated pressure. In this process, the remaining ethylene glycol or diethylene glycol decreases with an increase in the average molecular weight of the polyethylene glycol. In the case of polyethylene glycol having a relatively low molecular weight of from 190 to 420, the starting ethylene glycol or diethylene glycol tends to remain in large amounts.

In the case of polyethylene glycol having an average molecular weight of from 421 to 1,050, the ethylene glycol or diethylene glycol remains in a small amount compared with polyethylene glycol having an average molecular weight of from 190 to 420. However, ethylene glycol or diethylene glycol still remains in an amount exceeding the level required in the market.

Since these materials contain water, ethylene oxide is addition-polymerized with water so as to form ethylene glycol and diethylene glycol.

To remove ethylene glycol and diethylene glycol remaining in polyethylene glycol, use may be made of a method wherein low-boiling ethylene glycol and diethylene glycol are removed while bubbling nitrogen at a high temperature under reduced pressure. However, this method suffers from a problem in that when the contents of ethylene glycol and diethylene glycol are reduced to the level indicated by the following formula [I], the yield is largely lowered and deterioration arises due to excessive heating.

$$\text{Sum of ethylene glycol and diethylene glycol contents (ppm)} = \frac{150 \times 2900 \times 0.85^{(x-150)/44}}{x} \quad [\text{I}]$$

wherein x represents the average molecular weight of the polyethylene glycol.

SUMMARY OF THE INVENTION

Accordingly, an object of the present invention is to provide a polyethylene glycol having an average molecular weight of from 190 to 1,050 for use in fields with application to a living body, wherein the sum of the contents of ethylene glycol and diethylene glycol is extremely low, and a process for producing the same.

The above object of the present invention has been achieved by providing:

(1) polyethylene glycol for use in fields with application to a living body, wherein the sum of the contents of ethylene glycol and diethylene glycol in the polyethylene glycol is less than or equal to that expressed by the following formula [I]:

$$\text{Sum of ethylene glycol and diethylene glycol contents (ppm)} = \frac{150 \times 2900 \times 0.85^{(x-150)/44}}{x} \quad [\text{I}]$$

wherein x represents the average molecular weight of the polyethylene glycol and the polyethylene glycol has an average molecular weight ranging from 190 to 1,050; and (2) polyethylene glycol having an average molecular weight of from 190 to 210 for use in fields with application to a living body, containing ethylene glycol and diethylene glycol in a total amount of 200 ppm or less.

The formula [I] above is a formula whereby the sum of the ethylene glycol and diethylene glycol contents in polyethylene glycol at each molecular weight is calculated.

The ethylene glycol and diethylene glycol contents at each molecular weight are appropriately selected depending on the requirements of an intended application. In case of use in fields with application to a living body, it is favorable from the viewpoint of toxicity that the sum of the ethylene glycol and diethylene glycol contents is 2,500 ppm or less at a molecular weight of 200. Since the sum of ethylene glycol and diethylene glycol contained in the material and the sum of ethylene glycol and diethylene glycol formed as by-products during the reaction decrease with an increase in the addition mole number of ethylene oxide, the sum of the ethylene glycol and diethylene glycol contents in the product amounts to a value calculated by multiplying by a definite decreasing ratio.

In the above formula, 150 represents the molecular weight of triethylene glycol and 2,900 represents a coefficient concerning the acceptable level of the ethylene glycol and diethylene glycol contents in the material.

(x-150)/44 means the addition mole number of ethylene oxide. In the case where the decreasing ratio of the sum of the ethylene glycol and diethylene glycol contents per mole of ethylene oxide added is referred to as 0.85, the upper limit of the sum of ethylene glycol and diethylene glycol contained per mole (x g) of polyethylene glycol is thus indicated.

For some purposes, yet lower ethylene glycol and diethylene glycol levels are required. In the case of polyethylene glycol having a low molecular weight of from 190 to 210, in particular, the sum of the ethylene glycol and diethylene glycol contents is desirably 200 ppm or less.

The present invention further provides a process for producing such a polyethylene glycol. More particularly, the present invention provides:

(3) a process for producing polyethylene glycol according to (1) or (2) above which comprises addition-polymerizing ethylene oxide to triethylene glycol; and (4) the process for producing a polyethylene glycol according to (3) above, which comprises, before the addition polymerization with ethylene oxide, dehydrating the triethylene glycol in a reactor at 70 to 150° C. under a reduced pressure of from 0 to 0.013 MPa for 0.5 to 3 hours.

DETAILED DESCRIPTION OF THE INVENTION

The polyethylene glycol provided by the present invention is a polyethylene glycol for use in fields with application to a living body which has an average molecular weight ranging from 190 to 1,050, and the sum of the contents of ethylene glycol and diethylene glycol is less or equal to that expressed by formula [I] below.

The polyethylene glycol provided by the present invention, which is a polyethylene glycol having an average molecular weight ranging from 190 to 210 and the sum of the contents of ethylene glycol and diethylene glycol of less than or equal to that expressed by the following formula [I], still preferably 200 ppm or less, is highly useful. This is because there has been no polyethylene glycol meeting the standards as defined in the Pharmacopoeia of Japan and United States Pharmacopoeia and such a polyethylene glycol is in high demand in the market.

$$\text{Sum of ethylene glycol and diethylene glycol contents (ppm)} = \frac{150 \times 2900 \times 0.85^{(x-150)/44}}{x} \quad [I]$$

wherein x represents the average molecular weight of the polyethylene glycol measured by the method described in the "Polyethylene glycol/Official Monographs" section of THE UNITED STATES PHARMACOPEIA 24, THE NATIONAL FORMULARY 19, published by UNITED STATES PHARMACOPEIAL CONVENTION, INC. on Jan. 1, 2000.

The upper limits at respective molecular weights calculated in accordance with the above formula [I] are as follows: 1,808 ppm in case of a polyethylene glycol having a molecular weight of 200, 833 ppm in case of a polyethylene glycol having a molecular weight of 300, 432 ppm in case of a polyethylene glycol having a molecular weight of 400, 138 ppm in case of a polyethylene glycol having a molecular weight of 600, and 19 ppm in case of a polyethylene glycol having a molecular weight of 1,000.

Preferred values at respective molecular weights are as follows: 200 ppm in case of a polyethylene glycol having a molecular weight of 200, 150 ppm in case of a polyethylene glycol having a molecular weight of 300, 100 ppm in case of a polyethylene glycol having a molecular weight of 400, 50 ppm in case of a polyethylene glycol having a molecular weight of 600, and 15 ppm in case of a polyethylene glycol having a molecular weight of 1,000.

A polyethylene glycol having the sum of ethylene glycol and diethylene glycol contents exceeding the level as defined by the above formula [I] is undesirable because of the excessively high content of impurities. The lower limit of the sum of ethylene glycol and diethylene glycol contents may be 1 ppm or more in view of the detection limit of the measurement method.

The polyethylene glycol for use in fields with application to a living body provided by the present invention is a physiologically useful polyethylene glycol. More particularly, it is a polyethylene glycol which is usable in products directly applied to the human body in fields with application to a living body such as drugs, cosmetics and toiletries. For example, it is useful as a medicinal base in dissolution aids, emulsifiers, dispersants, fillers, lubricating agents, etc., for injection preparations, external preparations, oral preparations and the like. Furthermore, it is useful as a cosmetic material for body cleansers such as toilet soaps, shampoos, rinses, facial cleansers and toothpastes and cosmetics such as cosmetic lotions, lotions, foundations, perfumes and lipsticks.

The polyethylene glycol provided by the present invention which has small ethylene glycol and diethylene glycol contents and an average molecular weight ranging from 190 to 1,050 can be produced by addition-polymerizing ethylene oxide to triethylene glycol in the presence of an alkali catalyst such as sodium hydroxide or potassium hydroxide.

Although the triethylene glycol for use as a starting material is not restricted in purity, it is preferable to use triethylene glycol having a purity of 99.5% or more, still preferably 99.95% or more. The triethylene glycol purity can be elevated by distilling, etc.

The alkali catalyst for use in the present invention is a strongly alkaline substance such as sodium hydroxide or potassium hydroxide. It is preferably added in an amount of from 0.005 to 1.0% by weight, still preferably from about 0.01 to 0.5% by weight, based on the triethylene glycol that is supplied.

In the production process provided by the present invention, the ethylene oxide addition-polymerization reaction is carried out preferably at a reaction temperature of from 80 to 230° C., still preferably from 120 to 180° C., and under a reaction pressure of from 0 to 1 MPa, still preferably from 0.2 to 0.6 MPa.

The formation of ethylene glycol and diethylene glycol as by-products can be suppressed, prior to the addition-polymerization of ethylene oxide to triethylene glycol, by heating triethylene glycol in a reactor to 70 to 150° C. and bubbling nitrogen gas under reduced pressure of 0 to 0.013 MPa for 0.5 to 3 hours to thereby eliminate water from the starting materials and the catalyst.

In this case, the ethylene glycol and diethylene glycol contents can be determined by the following method.

This method is carried out by reference to *Echiren Gurikoru Oyobi Jiechiren Grikoru no Gendo* (Limit of Ethylene Glycol and Diethylene Glycol) described in *Poriechiren Gurikoru no Kokusai Chowa An* (International Harmonization Proposal of Polyethylene glycol) (Stage 3), J P Forum,; Vol. 8, No. 4, 291–297 (1999). The determination conditions are as follows.

<Conditions for the Determination of Ethylene Glycol and Diethylene Glycol Contents>

Preparation of internal standard solution: 100 mg of 1,4-butanediol is precisely weighed in a 100 mL graduated flask and diluted up to the marked line with distilled water.

Preparation of standard solutions: 50 mg portions of ethylene glycol, diethylene glycol and 1,4-butanediol are each precisely weighed into a 100 mL graduated flask and diluted with distilled water.

Preparation of sample solutions: 4 g portions of samples to be measured are each precisely weighed into a 10 ml container and 5 ml of the internal standard solution and 1 ml of distilled water are precisely added thereto. After capping, the mixture is well shaken.

Analytical conditions: Gas chromatographic measurement is carried out under the following conditions.

Column: WCOT FUSEDSILICA 30 mm×0.53 mm CP WAX 52CB film thickness: 1.0 μm (manufactured by GL Science).

Carrier gas: He (helium gas).

Linear velocity: 40 cm/sec.

Split vent flow: 100 ml/min.

Injection temperature: 250° C.

Detector temperature: 260° C.

Column temperature: 180° C.→10° C./min→260° C. (22 min).

Injection volume: 1 μl.

Calculation method: A response coefficient $F_N$ is calculated based on the peak areas obtained from the standard solution and each sample solution with the use of formula (1) below. Then, ethylene glycol and diethylene glycol are quantified using the formula (2).

$$F_N = (C_N r_{SI})/(C_{SI} r_{SN}) \quad (1)$$

$C_N$: concentration (μg/ml) of ethylene glycol or diethylene glycol in the standard solution $r_{SI}$: peak area of the internal standard obtained from the standard solution;

$C_{SI}$: concentration (μg/ml) of the internal standard in the standard solution; and $r_{SN}$: peak area of ethylene glycol or diethylene glycol obtained from the standard solution.

$$\text{Content (\% by weight)} = (F_N C_I r_N)/(2000 r_I W) \quad (2)$$

$C_I$: concentration (μg/ml) of the internal standard in the internal standard solution;

$r_N$, $r_I$: peak areas of ethylene glycol or diethylene glycol and the internal standard obtained respectively from the sample solutions;

W: weight (g) of each target substance in the sample solution.

$$\text{Content (ppm)} = \text{content (\% by weight)} \times 10000 \quad (3)$$

The polyethylene glycol obtained by the present invention can be further processed by eliminating excessive ethylene oxide under reduced pressure and by eliminating the alkali catalyst by neutralizing the alkali catalyst with an acid such as phosphoric acid or hydrochloric acid or using an adsorbent. Furthermore, antioxidants such as dibutylhydroxyltoluene and tocopherol may be added thereto depending on the intended purpose.

Now, the invention will be illustrated in greater detail by reference to the following Examples. However, the present invention should not be construed as being limited thereto.

EXAMPLE 1

1,500 g of triethylene glycol having a purity of 99.95% and 0.88 g of potassium hydroxide (0.059% by weight based on the triethylene glycol) were fed into a 5 L reactor provided with a stirrer, a dropping unit and a nitrogen-bubbling line. Then the mixture was dehydrated at 110° C. under a reduced pressure of 0.0067 MPa while bubbling nitrogen gas thereinto for 1 hour. Subsequently, 510 g of ethylene oxide (excess ratio: 1.02) was fed thereinto while maintaining the reaction temperature at 140° C. and the reaction pressure at 0.4 MPa and the resultant mixture was reacted under stirring. After completely feeding the ethylene oxide, the mixture was aged at 140° C. over 1 hour. Then, ethylene oxide was eliminated therefrom at 100° C. under reduced pressure of 0.002 MPa for 1.5 hours. After cooling to 85° C., the mixture was neutralized by adding phosphoric acid and filtered to thereby give a target product (1) which was a polyethylene glycol having an average molecular weight of 202 (yield: 97%). When the obtained product was subjected to a smell test, no polyethylene glycol degradation smell was noticeable.

EXAMPLE 2

1,500 g of triethylene glycol having a purity of 99.95% and 1.32 g of potassium hydroxide (0.088% by weight based on the triethylene glycol) were fed into a 5 L reactor provided with a stirrer, a dropping unit and a nitrogen-bubbling line. Then, the mixture was dehydrated at 110° C. under reduced pressure of 0.0067 MPa while bubbling nitrogen gas thereinto for 1 hour. Subsequently, 1,530 g of ethylene oxide (excess ratio: 1.02) was fed thereinto while maintaining the reaction temperature at 140° C. and the reaction pressure at 0.4 MPa and the resultant mixture was reacted under stirring. After treating as in Example 1, a target product (2) which was a polyethylene glycol having an average molecular weight of 306 was obtained (yield: 95%). When the thus obtained product was subjected to a smell test, no polyethylene glycol degradation smell was noticeable.

EXAMPLE 3

1,500 g of triethylene glycol having a purity of 99.95% and 1.76 g of potassium hydroxide (0.117% by weight based on the triethylene glycol) were fed into a 5 L reactor provided with a stirrer, a dropping unit and a nitrogen-bubbling line. Then, the mixture was dehydrated at 110° C. under reduced pressure of 0.0067 MPa while bubbling nitrogen gas thereinto for 1hour. Subsequently, 2,550 g of ethylene oxide (excessive ratio: 1.02) was fed thereinto while maintaining the reaction temperature at 140° C. and the reaction pressure at 0.4 MPa and the resultant mixture was reacted under stirring. After treating as in Example 1, a target product (3) which was a polyethylene glycol having an average molecular weight of 406 was obtained (yield: 96%). When the thus obtained product was subjected to a smell test, no polyethylene glycol degradation smell was noticeable.

EXAMPLE 4

1,500 g of triethylene glycol having a purity of 99.95% and 0.88 g of potassium hydroxide (0.059% by weight based on the triethylene glycol) were fed into a 5 L reactor provided with a stirrer, a dropping unit and a nitrogen-bubbling line. Then, 510 g of ethylene oxide (excess ratio: 1.02) was fed thereinto while maintaining the reaction temperature at 140° C. and the reaction pressure at 0.4 MPa and the resultant mixture was reacted under stirring. After treating as in Example 1, a target product (4) which was a polyethylene glycol having an average molecular weight of 197 was obtained (yield: 97%). When the thus obtained product was subjected to a smell test, no polyethylene glycol degradation smell was noticeable.

EXAMPLE 5

900 g of triethylene glycol having a purity of 99.95% and 1.58 g of potassium hydroxide (0.176% by weight based on the triethylene glycol) were fed into a 5 L reactor provided with a stirrer, a dropping unit and a nitrogen-bubbling line. Then the mixture was dehydrated at 110° C. under reduced pressure of 0.0067 MPa while bubbling nitrogen gas thereinto for 1 hour. Subsequently, 2,754 g of ethylene oxide (excess ratio: 1.02) was fed thereinto while maintaining the reaction temperature at 140° C. and the reaction pressure at 0.4 MPa and the resultant mixture was reacted under stirring. After treating as in Example 1, a target product (5) which was a polyethylene glycol having an average molecular weight of 602 was obtained (yield: 95%). When the thus obtained product was subjected to a smell test, no polyethylene glycol degradation smell was noticeable.

Comparative Example 1

1,060 g of diethylene glycol and 0.88 g of sodium hydroxide (0.083% by weight based on the diethylene glycol) were fed into a 5 L reactor provided with a stirrer, a dropping unit and a nitrogen-bubbling line. Then, 959 g of ethylene oxide (excess ratio: 1.02) was fed thereinto while maintaining the reaction temperature at 140° C. and the reaction pressure at 0.4 MPa and the resultant mixture was reacted under stirring. After treating as in Example 1, a target product (6) which was a polyethylene glycol having an average molecular weight of 201 was obtained (yield: 96%).

Comparative Example 2

1,060 g of diethylene glycol and 0.88 g of potassium hydroxide (0.083% by weight based on the diethylene glycol) were fed into a 5 L reactor provided with a stirrer, a dropping unit and a nitrogen-bubbling line. Then, the mixture was dehydrated at 110° C. under reduced pressure of 0.0067 MPa while bubbling nitrogen gas thereinto for 1 hour. Subsequently, 959 g of ethylene oxide (excess ratio: 1.02) was fed thereinto while maintaining the reaction temperature at 140° C. and the reaction pressure at 0.4 MPa and the resultant mixture was reacted under stirring. After treating as in Example 1, a target product (7) which was a polyethylene glycol having an average molecular weight of 198 was obtained (yield: 97%).

Comparative Example 3

620 g of diethylene glycol and 0.88 g of sodium hydroxide (0.142% by weight based on the diethylene glycol) were fed into a 5 L reactor provided with a stirrer, a dropping unit and a nitrogen-bubbling line. Then, 1,408 g of ethylene oxide (excess ratio: 1.02) was fed thereinto while maintaining the reaction temperature at 140° C. and the reaction pressure at 0.4 MPa and the resultant mixture was reacted under stirring. After treating as in Example 1, a target product (8) which was a polyethylene glycol having an average molecular weight of 205 was obtained (yield: 95%).

Comparative Example 4

620 g of ethylene glycol and 0.88 g of potassium hydroxide (0.142% by weight based on the ethylene glycol) were fed into a 5 L reactor provided with a stirrer, a dropping unit and a nitrogen-bubbling line. Then, the mixture was dehydrated at 110° C. under reduced pressure of 0.0067 MPa while bubbling nitrogen gas thereinto for 1 hour. Subsequently, 1,408 g of ethylene oxide (excess ratio: 1.02) was fed thereinto while maintaining the reaction temperature at 140° C. and the reaction pressure at 0.4 MPa and the resultant mixture was reacted under stirring. After treating as in Example 1, a target product (9) which was a polyethylene glycol having an average molecular weight of 203 was obtained (yield: 94%).

Comparative Example 5

1,060 g of diethylene glycol and 1.32 g of sodium hydroxide (0.125% by weight based on the diethylene glycol) were fed into a 5 L reactor provided with a stirrer, a dropping unit and a nitrogen-bubbling line. Then, 1,979 g of ethylene oxide (excess ratio: 1.02) was fed thereinto while maintaining the reaction temperature at 140° C. and the reaction pressure at 0.4 MPa and the resultant mixture was reacted under stirring. After treating as in Example 1, a target product (10) which was a polyethylene glycol having an average molecular weight of 312 was obtained (yield: 96%).

Comparative Example 6

1,060 g of diethylene glycol and 1.76 g of potassium hydroxide (0.166% by weight based on the diethylene glycol) were fed into a 5 L reactor provided with a stirrer, a dropping unit and a nitrogen-bubbling line. Then, 2,999 g of ethylene oxide (excess ratio: 1.02) was fed thereinto while maintaining the reaction temperature at 140° C. and the reaction pressure at 0.4 MPa and the resultant mixture was reacted under stirring. After treating as in Example 1, a target product (11) which was a polyethylene glycol having an average molecular weight of 412 was obtained (yield: 95%).

Comparative Example 7

1,060 g of diethylene glycol and 1.76 g of potassium hydroxide (0.166% by weight based on the diethylene glycol) were fed into a 5 L reactor provided with a stirrer, a dropping unit and a nitrogen-bubbling line. Then, the mixture was dehydrated at 110° C. under reduced pressure of 0.0067 MPa while bubbling nitrogen gas thereinto for 1 hour. Subsequently, 2999 g of ethylene oxide (excessive ratio: 1.02) was fed thereinto while maintaining the reaction temperature at 140° C. and the reaction pressure at 0.4 MPa and the resultant mixture was reacted under stirring. After treating as in Example 1, a target product (12) which was a polyethylene glycol having an average molecular weight of 409 was obtained (yield: 95%).

Comparative Example 8

848 g of diethylene glycol and 2.11 g of potassium hydroxide (0.249% by weight based on the diethylene glycol) were fed into a 5 L reactor provided with a stirrer, a dropping unit and a nitrogen-bubbling line. Then, the mixture was dehydrated at 110° C. under reduced pressure of 0.0067 MPa while bubbling nitrogen gas thereinto for 1 hour. Subsequently, 4,031 g of ethylene oxide (excess ratio: 1.02) was fed thereinto while maintaining the reaction temperature at 140° C. and the reaction pressure at 0.4 MPa and the resultant mixture was reacted under stirring. After treating as in Example 1, a target product (13) which was a polyethylene glycol having an average molecular weight of 610 was obtained (yield: 94%).

The ethylene glycol and diethylene glycol contents in the target products obtained in Examples 1 to 5 and Comparative Examples 1 to 8 were measured. Table 1 summarizes the results. The ethylene glycol and diethylene glycol contents were measured in accordance with <Conditions for the determination of ethylene glycol and diethylene glycol contents> as described above. The smell test was carried out as follows.

Smell Test:

1 ml of a target product was placed in a beaker and its smell was evaluated in accordance with the following criteria.

No smell: no or little noticeable smell.
Smelling: noticeable polyethylene glycol degradation smell.

TABLE 1

Ethylene glycol and diethylene glycol contents

|  | Average m.w. | Ethylene glycol content (ppm) | Diethylene glycol content (ppm) | Total content (ppm) |
|---|---|---|---|---|
| Ex. 1 | 202 | 26 | 76 | 102 |
| Ex. 2 | 306 | 9 | 25 | 34 |
| Ex. 3 | 406 | 3 | 10 | 13 |
| Ex. 4 | 197 | 132 | 261 | 393 |
| Ex. 5 | 602 | ND | 10 | 10 |
| C. Ex. 1 | 201 | 1,085 | 87,285 | 88,370 |
| C. Ex. 2 | 198 | 59 | 53,439 | 53,498 |
| C. Ex. 3 | 205 | 57,470 | 130,644 | 188,144 |
| C. Ex. 4 | 203 | 31,057 | 64,589 | 95,646 |
| C. Ex. 5 | 312 | 748 | 12,457 | 13,205 |
| C. Ex. 6 | 412 | 575 | 2,313 | 2,888 |
| C. Ex. 7 | 409 | 31 | 1,189 | 1,220 |
| C. Ex. 8 | 610 | 127 | 91 | 218 |

ND: not detected.

In the above table, the products of Examples 1, 2, 3 and 5 are polyethylene glycols respectively having molecular weights of from 190 to 210, from 285 to 315, from 380 to 420 and from 570 to 630 which were prepared using triethylene glycol as a starting material and dehydrating the triethylene glycol in a reactor before adding ethylene oxide.

The product of Example 4 is a polyethylene glycol having a molecular weight of from 190 to 210 which was prepared using triethylene glycol as a starting material and without dehydrating the triethylene glycol before the addition polymerization with ethylene oxide.

By using triethylene glycol as a starting material and addition-polymerizing with ethylene oxide, the ethylene glycol and diethylene glycol contents can be regulated to not more than the level defined by the above-described formula [I].

In case of a polyethylene glycol having a molecular weight of from 190 to 210, furthermore, the sum of the ethylene glycol and diethylene glycol contents can be lessened to 200 ppm or less by dehydrating the starting material before the addition polymerization with ethylene oxide.

On the other hand, the products of Comparative Examples 1 and 2 are polyethylene glycols each having a molecular weight of from 190 to 210 which were prepared using diethylene glycol as a starting material and dehydrating the diethylene glycol before the addition polymerization of ethylene oxide (Comparative Example 2) or without dehydrating (Comparative Example 1).

The products of Comparative Examples 3 and 4 are polyethylene glycols each having a molecular weight of from 190 to 210 which were prepared using ethylene glycol as a starting material and dehydrating the ethylene glycol before the addition polymerization of ethylene oxide (Comparative Example 4) or without dehydrating (Comparative Example 3).

The product of Comparative Example 5 is a polyethylene glycol having a molecular weight of from 285 to 315 which was prepared using diethylene glycol as a starting material and without dehydrating the diethylene glycol before the addition polymerization of ethylene oxide.

Further, the products of Comparative Examples 6 and 7 are polyethylene glycols each having a molecular weight of from 380 to 420 which were prepared using diethylene glycol as a starting material and dehydrating the diethylene glycol before the addition polymerization of ethylene oxide (Comparative Example 7) or without dehydrating (Comparative Example 6).

Furthermore, the product of Comparative Example 8 is a polyethylene glycol having a molecular weight of from 570 to 630 which was prepared using diethylene glycol as a starting material and dehydrating the diethylene glycol before the addition polymerization of ethylene oxide.

As the results of these Comparative Examples clearly indicate, in the case of preparing polyethylene glycols using diethylene glycol as a starting material and addition polymerizing with ethylene oxide, the products thus obtained contained ethylene glycol and diethylene glycol in large amount. In the case of preparing polyethylene glycols using ethylene glycol as a starting material and addition polymerizing with ethylene oxide, the products thus obtained had further elevated ethylene glycol and diethylene glycol levels. This tendency remained unchanged in the case of dehydrating the starting material before the addition polymerization with ethylene oxide.

As these results show, the polyethylene glycol provided by the present invention can regulate the ethylene glycol and diethylene glycol contents to an extremely low level by using triethylene glycol as a starting material and addition polymerizing with ethylene oxide. By dehydrating the triethylene glycol starting material in a reactor before the addition polymerization with ethylene oxide, the ethylene glycol and diethylene glycol contents can be regulated to a further lowered level.

As discussed above, the present invention provides a polyethlene glycol having the sum of the contents of ethylene glycol and diethylene glycol of less than or equal to that expressed by the following formula [I] and having an average molecular weight ranging from 190 to 1,050 adapted for use in fields with application to a living body such as medicinal preparations and cosmetics. Among all, it is found that a polyethylene glycol having an average molecular weight of from 190 to 210 meets the standards for ethylene glycol and diethylene glycol contents as defined in the Pharmacopoeia of Japan or United States Pharmacopoeia.

$$\text{Sum of ethylene glycol and diethylene glycol contents (ppm)} = \frac{150 \times 2900 \times 0.85^{(x-150)/44}}{x} \quad [\text{I}]$$

wherein x represents the average molecular weight of the polyethylene glycol.

Since no such polyethylene glycol has hitherto been produced and such polyethylene glycols are in high demand, the present invention, which satisfies the above requirement, is extremely useful in the biological industries.

This application is based on Japanese Patent Application Nos. JP 2001-89455 filed Mar. 27, 2001 and 2001-357035 filed Nov. 22, 2001, the disclosures of which are incorporated herein by reference in their entirety.

What is claimed is:

1. Polyethylene glycol for use in fields with application to a living body, wherein the sum of the contents of ethylene glycol and diethylene glycol in the polyethylene glycol is less than or equal to that expressed by the following formula [I]:

$$\text{Sum of ethylene glycol and diethylene glycol contents (ppm)} = \frac{150 \times 2900 \times 0.85^{(x-150)/44}}{x} \quad [I]$$

wherein x represents the average molecular weight of the polyethylene glycol, and the polyethylene glycol has an average molecular weight ranging from 190 to 1,050.

2. Polyethylene glycol having an average molecular weight of from 190 to 210 for use in fields with application to a living body, containing ethylene glycol and diethylene glycol in a total amount of 200 ppm or less.

* * * * *